R. JOHNSON.
INTERNAL COMBUSTION ENGINE.
APPLICATION FILED MAY 3, 1919. RENEWED SEPT. 26, 1921.

1,396,371.

Patented Nov. 8, 1921.
4 SHEETS—SHEET 4.

Inventor
Robert Johnson

By William Cabinton

Attorney

UNITED STATES PATENT OFFICE.

ROBERT JOHNSON, OF SAULT STE. MARIE, ONTARIO, CANADA.

INTERNAL-COMBUSTION ENGINE.

1,396,371.   Specification of Letters Patent.   Patented Nov. 8, 1921.

Application filed May 3, 1919, Serial No. 294,375. Renewed September 26, 1921. Serial No. 503,471.

*To all whom it may concern:*

Be it known that I, ROBERT JOHNSON, a subject of the King of Great Britain, residing at Sault Ste. Marie, Province of Ontario, Canada, have invented certain new and useful Improvements in Internal-Combustion Engines; and I do hereby declare that the following is a full, clear, and exact description of the invention, such as will enable others skilled in the art to which it appertains to make and use the same.

The invention relates to internal combustion engines and the principal object thereof, resides in the provision of an engine of the two cycle type embodying the same efficiency as a four cycle type.

A further object of the invention is to provide an engine of the above type, wherein the mechanisms associated with the four cycle type are eliminated.

A still further object of the invention contemplates the provision of means for a more perfect admixture of the combustive gases within the explosive chamber of the engine and the resultant utilization of the power stroke to regulate the admission of the explosive gases to an auxiliary chamber.

A further object of the invention is to provide a vacuum system for the accumulation of the gases from the carbureter.

With the above and other objects in view which will hereinafter appear as the description continues, the invention consists of the novel features of construction, combination and formation of parts as will be hereinafter more fully described and particularly pointed out in the appended claims.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claims without departing from the spirit of the invention or sacrificing the efficiency of the same.

In the accompanying drawings.

Referring now more particularly to the accompanying drawings wherein like and corresponding parts are designated by similar reference characters throughout the several views.

Figure 1:
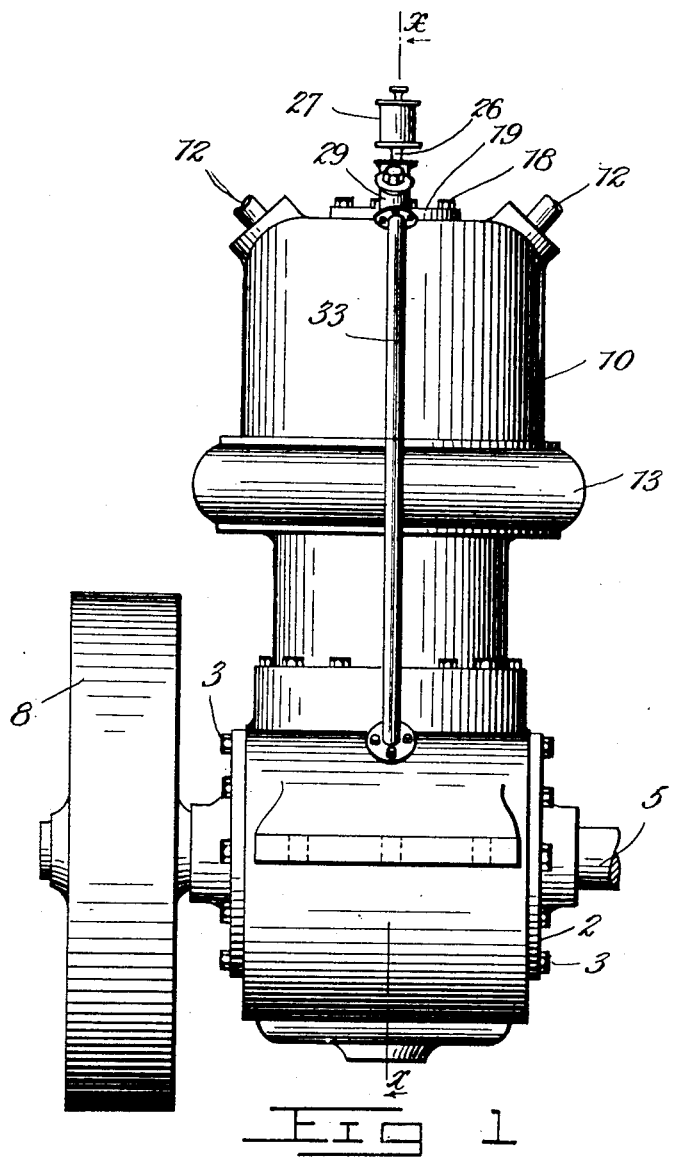
Figure 1 is a frontal elevational view of my improved engine.
Figure 2:
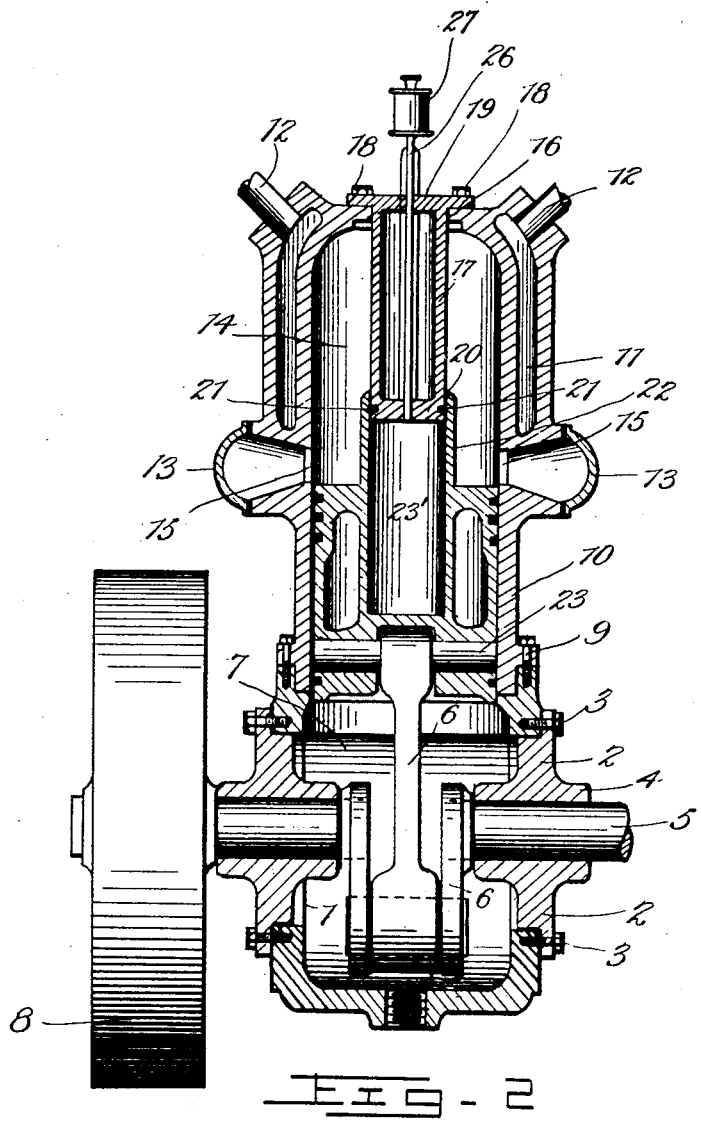
Fig. 2 is a vertical sectional view of the same.
Figure 3:
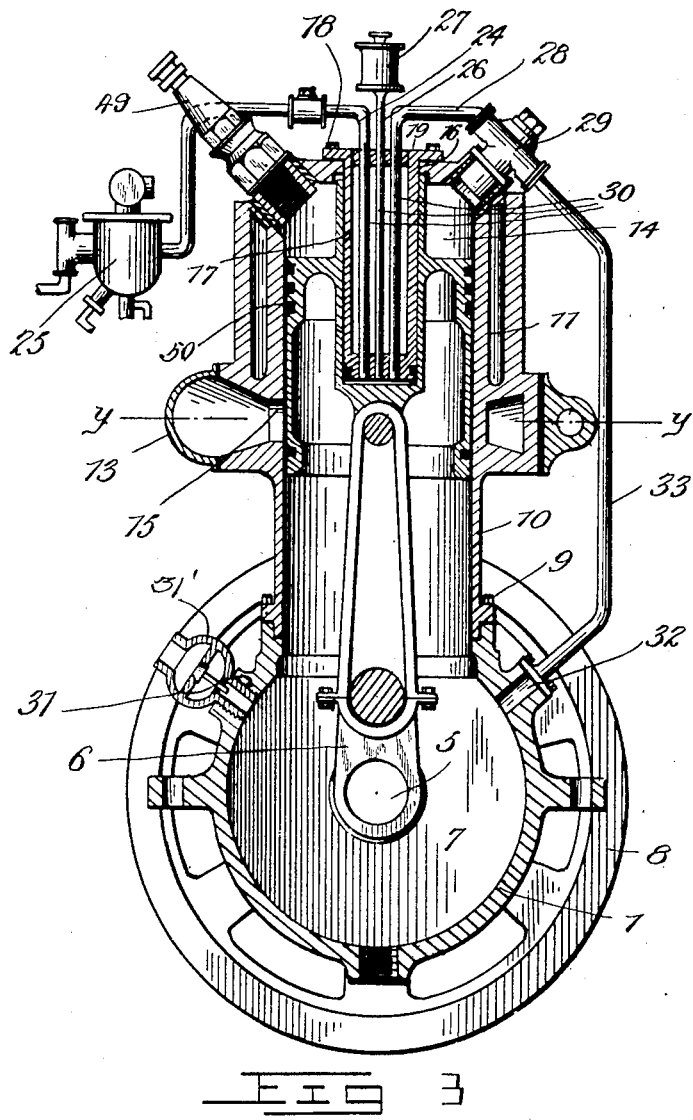
Fig. 3 is a vertical sectional view on line X—X of Fig. 1, with portions in elevation.
Figure 4:
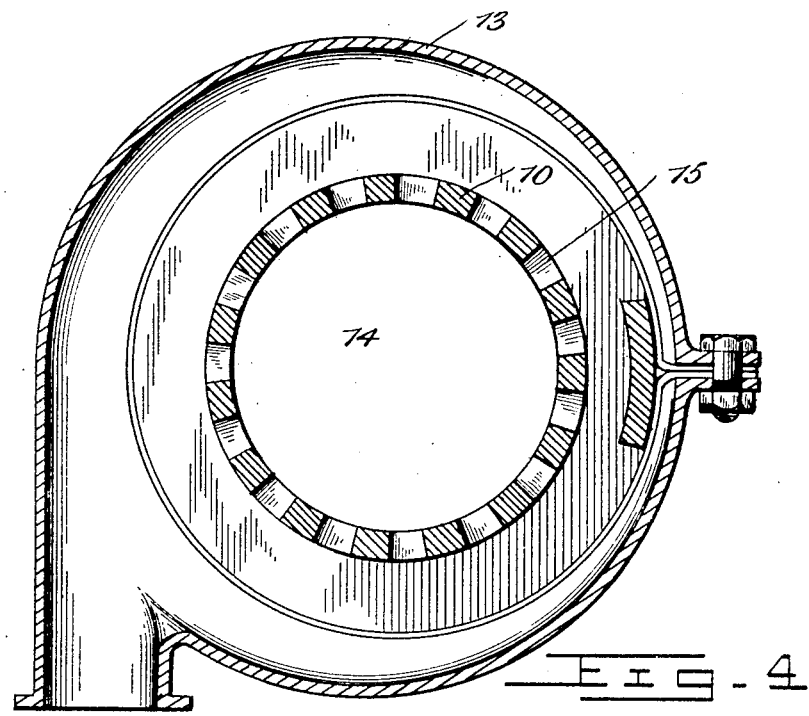
Fig. 4 is a cross sectional view on line Y—Y of Fig. 3, illustrating the exhaust manifold and ports; and, Fig. 5 is a cross sectional view of the gas and air admission valve.
Figure 5:
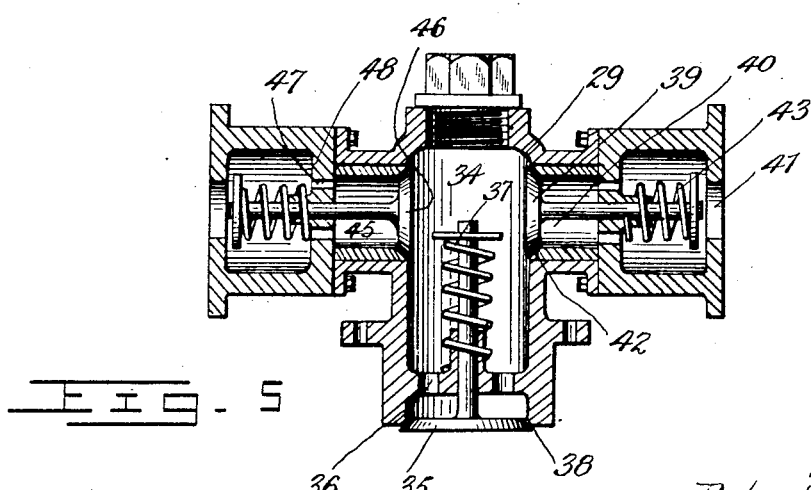

The engine embodying my improved construction comprises the hollow crank casing 1 which may be suitably mounted on the engine bed, not illustrated and has the plates 2 secured at each side by bolts 3, the latter providing bearings 4, for the shaft 5, carrying the usual crank 6, operable in the base chamber 7.

This drive shaft 5 has keyed thereto a fly wheel 8 and its opposite end may be connected up with a suitable transmission mechanism.

The upper end of the crank casing 2 is connected by the bolts 9, to the lower end of the main cylinder 10, having the usual water jacket 11, connected with suitable water supply pipes 12.

An exhaust manifold 13 is positioned intermediate the ends of said cylinder 10 and communicates with the explosion chamber 14, through the exhaust ports 15, formed in the opposite walls of the cylinder.

The upper closed end or head of the cylinder 10 is formed with a central opening 16 and a hollow cylindrical member 17 is secured to the said head by bolts 18 and projects downwardly within the said cylinder 10. The member 17 has solid head portions 19 and 20, the latter carrying a packing ring 21.

A piston 22 operates in the cylinder 10 and at its lower end has pivotal connection with the crank 6, through the shaft 23 carried thereby, so that motion is imparted to the drive shaft 5.

The piston 22 is formed with a central chamber 23′, adapted for the reception of the cylindrical member 17 in the cylinder head, during the power and compression strokes of the engine.

This cylindrical member 17 is apertured at its head portion 19 for the pipe connection 24 leading from the carbureter 25, a pipe connection 26 to a lubricating cup 27 and a pipe connection 28 leading to a regulating valve 29.

These pipe connections 24, 26 and 28 have vertical portions 30 extending through the cylindrical member 17 and communicate with the central chamber 23' of the piston 22 so that, upon the down or power stroke of the piston, a predetermined quantity of gaseous mixture will be drawn by vacuum into the piston chamber 23' and at the same time oil may be drawn from the cup 27 to properly lubricate these parts.

It has thus been shown, how the gas is introduced into the auxiliary chamber 23' of the piston and such action takes place prior to the compression stroke of the engine, or in fact, during the power stroke and for the purpose of providing for the proper admixture of air with the explosive gas, I have means for accumulating air by compression in the base chamber 7 and for that purpose, I provide an opening 31, in the crank casing 1 in which the valve 31' is mounted and through which air is drawn during the up stroke of the piston 22.

Air chamber 7 is provided with an opening 32 and a pipe 33 leads from this opening and connects the said air chamber 7 with the regulating valve 29. This valve comprises a casing which is mounted on a diagonal plane in the main cylinder head and is formed with a central chamber 34, in which is mounted an inwardly acting plug 35 and communication between the chamber 34 and and the combustion chamber 14, is effected through openings 36 in the valve head. A coil spring 37 tensions the valve plug 35 into normal engagement with its seat 38. A similar plug member 39 controls the opening 40, and 41 leading from air intake pipe 33 and said plug member 39 is held in its normal engagement with seat 42 by a spring 43 and controls the entrance of air from pipe 33, through valve opening 41 and the head openings 44.

During the compression stroke of the engine the air will be drawn through the opening 31 of the crank casing into the chamber 7 and at the end of the working stroke after the exhaust ports 15 are opened to the air will be forced through opening 32, into pipe 33, unseating plug member 39 of the admission valve 29, and into valve chamber 34, thence through openings 36, and meanwhile the plug 35 will be unseated and allow a quantity of air into the combustion chamber 14. Likewise, on the working stroke of the piston 22, the same uncovers the ports 15 and the spent gases pass out through the manifold 13.

While the air is being forced into the explosive chamber 14, a third valve opening 45 leading from the valve chamber 34 is closed by an inwardly acting valve plug 46 of similar construction as the other plugs 35 and 39. This opening 45 and openings 47 in the head 48, communicate with the pipe 28 leading through the cylinder member 17 and upon the power stroke of the piston 22, a vacuum is created in the piston chamber 23' and thereby gas is drawn from the carbureter 25 through pipes 24 and 30 to the said piston chamber 23'. Upon the compression stroke, as the piston 22 is moving upward, the gas within piston chamber 23' is compressed by contact with the cylinder member 17, and is forced out through the vertical part 30 of pipe 28 and accordingly the escape of the gases, will unseat valve plug 46 of the admission valve 29 and allow the same to flow through the central chamber 34 and openings 36, the plug 35 being forced open to allow the escape of the gases into the combustion chamber 14, for admixture with the air.

When the piston moves upward, the air and gas are thus mixed and compressed and for igniting this gaseous mixture, I provide a spark plug 49 of normal construction and operation.

In the operation of my improved engine the crank shaft 5 is accelerated, or spun, either by crank or a mechanical contrivance and upon the downward stroke of the piston, a vacuum will be formed in the piston chamber 23', thus drawing a supply of gas from the carbureter thereto, at the same time, as the piston descends, the air contained in the crank chamber 7 will be forced out through opening 32 and pipe 33 and through valve 29 into the explosive chamber 14.

To establish a close union between the piston and the cylinder walls, I provide a plurality of packing rings 50 to reduce leakage to a minimum.

It is obvious that I have produced an engine embodying all of the characteristics and capabilities of the four cycle type and at the same time I have dispensed with the intricate and numerous mechanisms usually associated with engines of the four cycle type.

Having thus fully described my invention, what I claim as new and desire to secure by Letters Patent is:

1. An internal combustion engine comprising a cylinder, a piston operable in said cylinder, said piston formed with a chamber, a member arranged in said cylinder and adapted for engagement within said piston chamber, means for drawing gas to said chamber during the power stroke of the piston, means for supplying air for admixture with the gas at the end of the working stroke of the piston, and lubricating means for the piston chamber.

2. An internal combustion engine comprising a cylinder, a piston operable in said cylinder, said piston formed with a chamber, a member arranged in said cylinder and adapted for engagement in said piston chamber, vacuum means for drawing gas to said chamber during the power stroke of said piston, compression means for drawing air for admixture with the gas, and lubricating means for the cylinder member and chamber.

3. An internal combustion engine comprising a cylinder, a piston operable in said cylinder, said piston formed with a chamber, a member arranged in said cylinder and adapted for engagement within said piston chamber, means for drawing gas to said chamber during the power stroke and air to the cylinder at the end of the power stroke of the piston, and means for expelling the gas from the chamber to the cylinder during the compression stroke of the said piston.

4. An internal combustion engine comprising a casing and cylinder, a piston, a hollow plunger on said piston forming a fuel chamber, a member secured to the cylinder head and adapted for engagement within said hollow plunger, gas inlet and outlet pipes arranged in said member and communicating with said fuel chamber, an air inlet pipe between said casing and cylinder and means for drawing gas to said chamber during the power stroke and air to said cylinder at the end of the power stroke of the piston.

5. An internal combustion engine comprising a casing and cylinder, a piston, a hollow plunger on said piston forming a fuel chamber, a cylindrical member secured to the cylinder head and projecting downwardly into said cylinder, said member adapted for intermittent location within said fuel chamber, a gas supply pipe disposed in said member and communicating with the said chamber, means for drawing gas into said chamber during the power stroke of the piston, a valve, a fuel pipe arranged in said member and establishing communication between said fuel chamber and valve, a pipe leading from the crank casing to said valve and means for supplying air for admixture with the gas at the end of the working stroke of the piston.

In witness whereof I have hereunto set my hand.

ROBERT JOHNSON.